United States Patent [19]

Granberg et al.

[11] Patent Number: 4,479,206
[45] Date of Patent: Oct. 23, 1984

[54] SCANNING SONAR DISPLAY SYSTEM

[76] Inventors: Mauritz L. Granberg, 6325 Thomas Ave. S., Minneapolis, Minn. 55423; David G. Hanson, 717 Holland La. NE., Spring Lake Pk., Minn. 55432

[21] Appl. No.: 288,337

[22] Filed: Jul. 30, 1981

[51] Int. Cl.³ .......................... G01S 15/96; G01S 7/62
[52] U.S. Cl. ..................................... 367/104; 367/113
[58] Field of Search ........................ 367/104, 108, 113

[56] References Cited

U.S. PATENT DOCUMENTS

| | | | |
|---|---|---|---|
| 2,865,014 | 12/1958 | Malm | 367/104 |
| 3,793,619 | 2/1974 | Regis | 367/104 |
| 3,889,225 | 6/1975 | McKenzie et al. | 367/113 |
| 4,104,609 | 8/1978 | Minegishi et al. | 367/113 |
| 4,300,216 | 11/1981 | Barton, Jr. | 367/113 |
| 4,347,591 | 8/1982 | Stembridge et al. | 367/104 |

OTHER PUBLICATIONS

"Electronics", Jun. 1976, pp. 127-129.

Primary Examiner—Richard A. Farley
Attorney, Agent, or Firm—Burd, Bartz & Gutenkauf

[57] ABSTRACT

A Scanning Sonar Display System comprised of a TV monitor, a scanning mechanism with transducer, control logic with image memory and timing, a power source such as a 12 volt storage battery and a set of operator controls. The type of TV monitor used is well known and similar to those used by raster scan computer terminals. The scanning mechanism has a stepping motor with a 10 to 1 reduction cable drive system to rotate the transducer with home initializing contacts. The control logic includes two counters used as image memory address registers. The first, the refresh counter, is used for reading the image memory during refresh and for determining the horizontal and vertical sync for the TV monitor. The second, the entry counter, is used for writing sonar and depth data into the image memory and is also used for control of the stepping motor. Home initializing contacts are used to initialize this counter. The timing includes a timing ring which provides for continuous control of top delay, range, repetition rate, sonar burst width and transducer frequency. A unique feature of the timing ring is that it allows the scanning mechanism to scan at the maximum rate which is very important for this type of device. Range read out is given in a combination of numbers and dots so that the accuracy is equal to that of the resolution of the monitor.

18 Claims, 19 Drawing Figures

SCAN SURFACE                CRT SCREEN

OSCILLATOR 11
REPETITION
RATE
OUTOUT 20

— START OF CYCLE

ONE/SHOT 15
BURST WIDTH
OUTPUT 25

— BURST WIDTH VARIABLE

OSCILLATOR 12
TRANSDUCER
FREQUENCY
(200 KC)

— NUMBER OF OSCILLATIONS DEPENDS ON BURST WIDTH

ONE/SHOT 16
TOP DELAY
OUTPUT 28

— TOP DELAY VARIABLE

FLIP-FLOP 18
START F.F.
OUTPUT 32

— HIGH (ON STATE)

OSCILLATOR 13
DEPTH OSC.
OUTPUT

|— 256 OSCILLATIONS —|

SCANNING SONAR DISPLAY SYSTEM

BACKGROUND OF THE INVENTION

This invention relates to the use of a Raster Scan CRT Display to display sonar and related data. The present invention is concerned with displaying scanned sonar data with a correspondence of depth and direction to a given area on the CRT screen. This correspondence comes from coupling the direction of the transducer with the data shown on the CRT screen.

There are no low cost scanning sonars on the consumer market although they have been used by the military and to a lesser degree commercially for many years. In "Electronics", June 1946 page 126 Finn J. Larsen reported on the Ultrasonic Trainer AN/APS-T3 which was a scanning sonar used to emulate radar. A servo motor was used to rotate the transducer to simulate the rotation of a radar antenna.

A typical scanning sonar is described in U.S. Pat. No. 2,865,014 isued to R. H. Malm in Dec. 16, 1958. This sonar presents eata in a plan position indicator (PPI) or polar coordinate presentation. The phosphor of the CRT is used as the memory element. The transducer can be tilted and rotated and is driven by a geared closed loop servo system.

There is similarity between sonar and radar scaning systems in there presentations. Most of the scanning systems present data in polar coordinates although some use the x-y presentation. The AN/TPN-8 Radar has both the PPI and the x-y mode of presentation as described in the "Technical Manual Radar Set AN/TPN-8" approved Dec. 12, 1962 NAVSHIP 0967-104-1010.

The basic reason that scanning sonars are not on the consumer market is that they are too expensive and are not easily portable. Another reason is that most scanning sonars are too massive for small boats due to the use of massive geared drive systems which use expensive closed loop servo drive systems. However, sonar depth finders, sonar chart recorders and sonar CRT chart recorder type devices enjoy great popularity. There is a need for a sonar scanner which will compete in price with the CRT chart recorder and also be as portable.

It is the primary objective of this invention to provide a simple, reliable, portable and inexpensive scanning sonar display system for the consumer market. This is possible because of the unique methods of implementation which are described in this specification.

SUMMARY OF THE INVENTION

The present invention relates to sonar CRT scaners for use as a fish finder, for locating submerged objects, for determining bottom terrain features and as a navigational aid. In accordance with the invention there is provided a TV monitor, a scanning mechanism which includes a stepping motor for angular direction control, a 10 to 1 cable drive mechanism with pulley, a transducer mount with transducer, a transducer angle adjustment mechanism, initializing contacts and a structure for mounting of these components, control logic which includes image memory and timing, a power source and a set of operator controls. Also provided is the transducer driver and receiver circuitry which is discrete components but is similar to "A Single Chip Monolithic Sonar System" by T. M. Fredenksen and W. M. Howard, IEEE Journal of Solid State Circuits, Dec. 1974, Vol. SC-9 No. 6 pp 394-403 which is well known to those familiar in the state of the art.

Previous sonar CRT scanners used large and expensive geared mechanisms requiring closed loop servo motors and synchros. They are difficult to use on small boats because of their large size and weight. Most of these where analog systems using the persistence of the phosphor as the image memory thus requiring viewing in low ambient lighting.

It is therefore an object of this invention to provide a light weight, low cost (cost the same as the non-scan CRT chart type which is well known in the art) forward looking sonar CRT scanner. In this invention we have accomplished these goals by the following features: 1. The use of an open loop transducer drive system which uses a low cost stepping motor with the only feedback being the home initializing contacts. 2. The use of a very efficient low cost cable drive system for coupling the motor to the transducer. 3. The use of an entry counter for addressing the image memory when entering sonar and depth data and also using this counter to directly control the position of the stepping motor. This counter is initialized by the home contacts. 4. The use of a unique timing ring which provides for continuous change in top delay, range, repetition frequency, sonar burst width and transducer frequency. 5. The use of a low cost raster scan monitor as the display output device. The above-mentioned and other objects and features of the invention will be more clearly understood from the following detailed description thereof when read in conjunction with the drawings in which;

DESCRIPTION OF THE PREFERRED EMBODIMENTS

The invention employs the property of a transducer to send a sonic beam of energy through water when excited by a voltage at its resonant frequency. The invention controls the direction of the beam and receives and processes the return echos from the beam and displays this direction and depth data on the CRT display.

Figure 1:
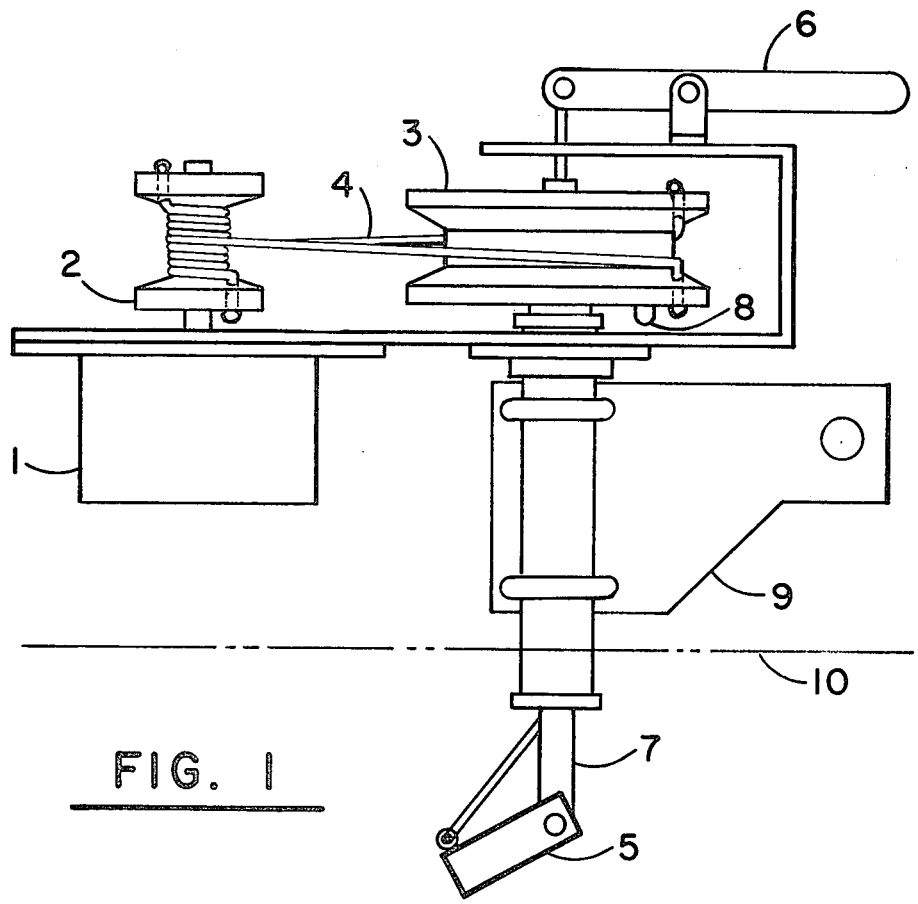
FIG. 1 shows the overall scanning mechanism.
Figure 2:
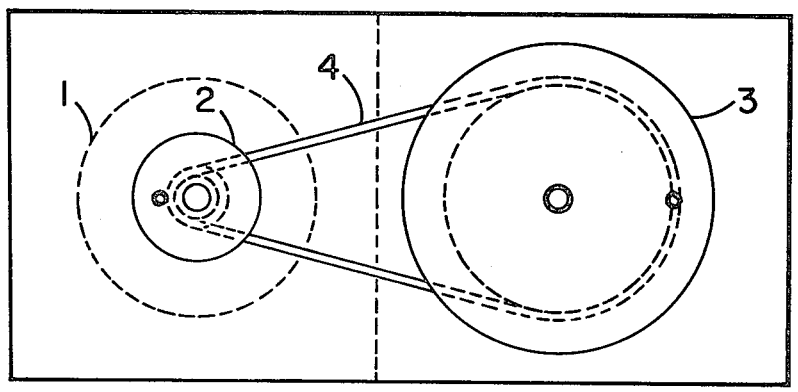
FIG. 2 is a top view of the cable drive system used to rotate the scanning mechanism.

The direction of the beam is controlled by the scanning mechanism shown in FIG. 1. The stepping motor 1 is used to control the precise angular direction for each sonic pulse. After the data for a given sonic pulse has been received and stored in the display image memory, the control logic commands the stepping motor to step to its new angular position for the next sonic pulse. In this manner directional data is obtained with the sonar return data. The transducer 5 shown is FIG. 1 is mounted on the end of a shaft 7 so that it can pivot about an axis perpendicular to the axis of the shaft. In operation the shaft on which the transducer is mounted is mounted vertically. Being able to pivot allows the angle between the direction of the sonic beam and the vertical axis to be changed by the operator using the angle adjustment mechanism 6 shown in FIG. 1. The rotational motion of the stepping motor is transferred to the vertical shaft 7 on which the transducer 5 is mounted through the spool 2, cable 4 and pulley 3 as shown in FIG. 1 and FIG. 2.

The spool 2 is mounted to the shaft of the stepping motor 1 of FIG. 1. As the motor rotates the spool 2, the cable 4 is wound up on one side of the spool while the cable on the other side is let out. Thus, the rotational motion of the spool is transferred to a rotational motion of the pulley 3 which is mounted to the shaft 7. In operation, the pulley 3 of FIG. 1 and FIG. 2 is only required to rotate through a maximum angle of 180 degrees. With this method of coupling, there is no slipping allowed which could result from the use of ordinary belt drive systems. This method of coupling is also very efficient allowing a relatively small stepping motor to be used for the drive motor. The total scanning mechanism is mounted with shaft 7 vertical and transducer 5 submerged below the water level 10 using the mounting bracket 9 shown in FIG. 1.

Figure 3:
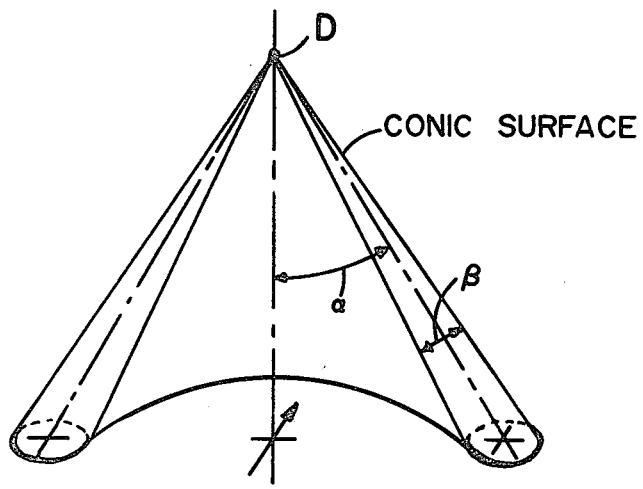
FIG. 3 shows a perspective view of the scanning zone of the transducer.

With the transducer located at Point D in FIG. 3 and adjusted such that the center line of the sonic beam is at an angle $\alpha$ with respect to the vertical shaft, then as the vertical shaft is rotated through 180 degrees, the sonic beam traces through a surface of half of a cone. The sonic beam is also conic in nature and can be considered to have an angle of $\beta$. Thus, the volume of water for sonic returns is confined to the volume between the inside and outside conic surfaces as shown in FIG. 3.

Figure 4:
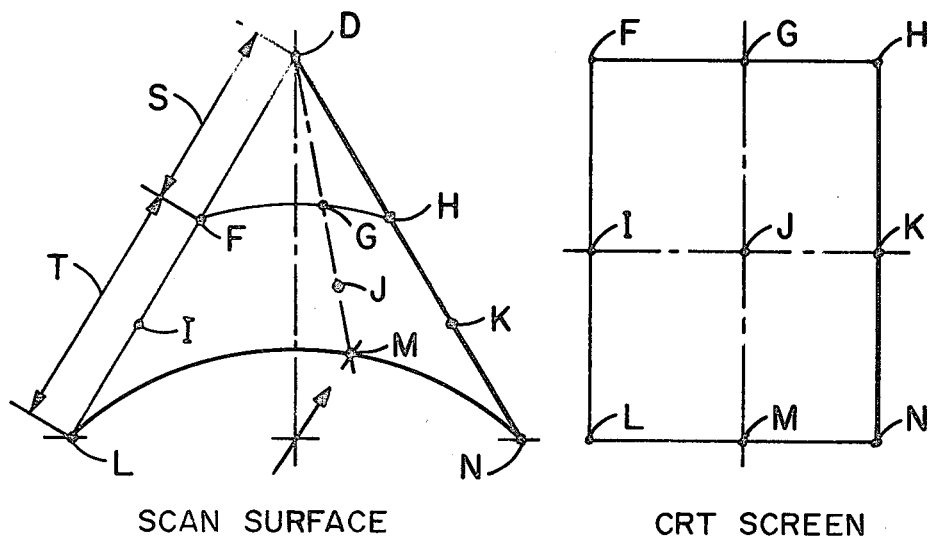
FIG. 4 shows the correspondence between direction and depth with the data show on the CRT display screen.

With the transducer located at point D as shown in FIG. 4, we will assume that the center line of the sonic beam follows the path of the half cone. The timing chain allows data from the transducer to a variable distance S along the surface of the cone to be ignored. The timing chain allows data to be taken for a variable distance T along the surface of the cone as shown in FIG. 4. This truncated surface of the half cone is thus mapped into the rectangular surface of the CRT screen. Thus, there is a unique correspondence with the direction and depth of a sonic return with a given point on the CRT screen. Corresponding points on the surface of the cone and on the drawing of the CRT screen (F,G,H,I,J,K,L,M,N) are shown in FIG. 4. Thus, if the scanning mechanism is oriented such that it sweeps through 180 degrees with the centerline pointing to the front as shown in FIG. 3, the data in the center of the CRT screen (along the line formed by points G, J, and M as shown in FIG. 4) is data which was received from returns located to the front of the mechanism. Also, data on the left side of the CRT screen (along the line formed by F, I, and L as shown in FIG. 4) is data which was received from returns located to the left side of the mechanism, while data on the right side of the CRT screen (along the line formed by H, K, and N as shown in FIG. 4) is data which was received from returns located to the right side of the mechanism. This allows the operator to easily determine from which direction the sonic returns were received.

Figure 5:
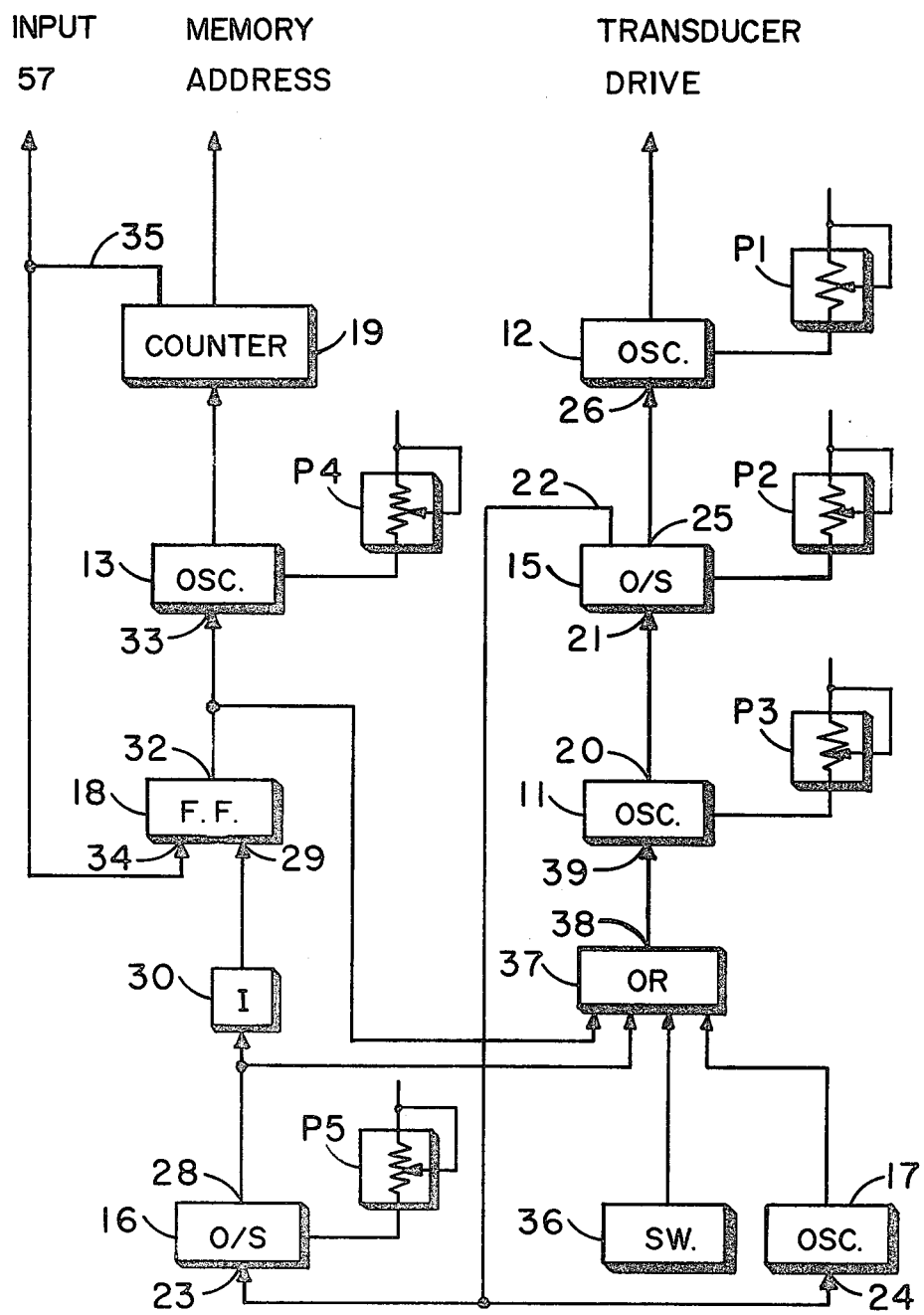
FIG. 5 is a schematic diagram of the unique timing chain which is used to control the continuously variable functions of top delay, range, repetition frequency, sonar burst width and transducer frequency.

The logic schematic diagram for the timing chain which controls the continuously variable functions of top delay, range, repetition frequency, angle conversion, sonar burst width and transducer frequency is shown in FIG. 5. It includes three controlled astable oscillators 11, 12, and 13 and three monostable oscillators 15, 16, and 17 used as one/shots, a D type flip-flop 18 used as a start flip-flop, and an eight bit counter 19 as shown in FIG. 5. The timing chain is initiated with the high to low transition of the output 20 of sonar pulse rate oscillator 11 which triggers the input 21 of one/shot 15 shown in FIG. 5. The output 22 of one/shot 15 then triggers the input 23 of one/shot 16 and the input 24 of one/shot 17 with its high to low transition. The complementary output 25 of one/shot 15 goes to a logic high level thus allowing astable oscillator 12 to oscillate at the resonant frequency of the transducer by enabling the reset input 26 of the oscillator. The pulse width of one/shot 15 is thus the time duration of the sonic burst and is adjustable using potentiometer P2 shown in FIG. 5.

Potentiometer P1 is used to electrically tune the oscillator 12 to the resonant mechanical oscillating frequency of the transducer. The trailing edge of output 28 of one/shot 16 is used to clock input 29 of the start flip-flop 18. An inverter 30 is used to obtain the proper polarity of signal at input 29. The time delay of one/shot 16 is continuously adjustable using potentiometer P5. This allows the operator to control the amount of time from when the sonar burst is initiated to the time when return data is first stored into the display image memory. This delay is referred to as the top delay of the system. Setting of start flip-flop 18 causes its output 32 to go to the logic high level thus allowing astable oscillator 13 to oscillate at the sampling frequency for sonic returns by enabling the reset input 33 of the oscillator.

The time between samples is continuously adjustable using poteniometer P4 which controls the depth displayed on the CRT screen. The eight bit counter 19 is incremented once for each return sample thus allowing 256 samples to be taken in before the counter 19 overflows. This signal output 35 of the counter is used to clear the start flip-flop 18. During the time the start flip-flop 18 is set, and during the time of the delay one/shot pulse 28, the sonar pulse rate oscillator 11 is disabled. It is also disabled for at least the minimum time of one/shot 17. It can also be disabled permanently using switch 36. These four disable signals are "ored" together via the four input or gate 37 whose output 38 is tied into the reset input 39 of the sonar pulse rate oscillator 11. The sonar pulse rate oscillator 11 is also continuously adjustable using potentiometer P3 as shown in FIG. 5. The repetition rate of this oscillator is thus determined by its internal timing components, P3, and by one of the four allowed disable signals which has the longest time.

Figure 6:
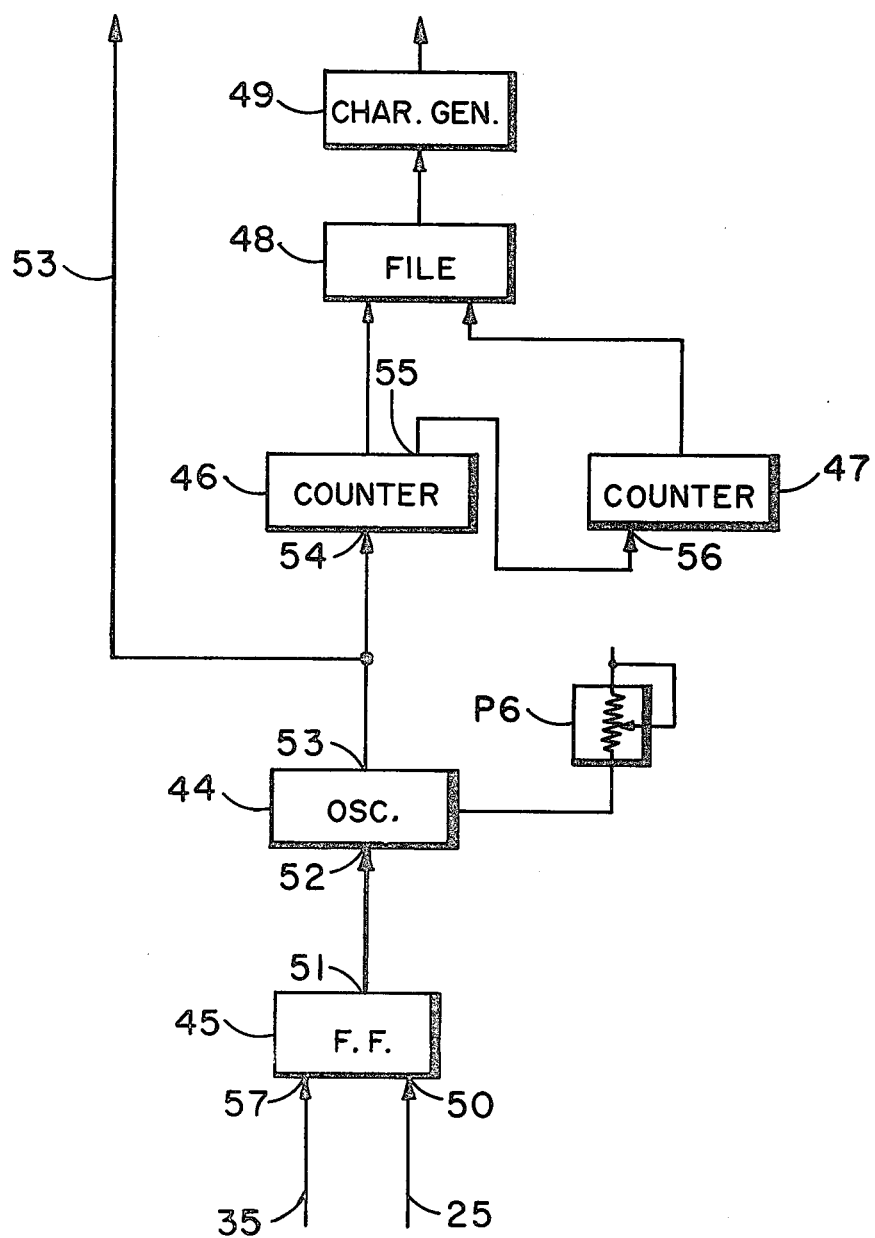
FIG. 6 is a schematic diagram of the logic associated with the depth data indicators which are displayed on the CRT screen.

The logic schematic diagram associated with the depth data indicators is shown in FIG. 6. It includes one controlled astable oscillator 44, a stop flip-flop 45, two decimal counter chips (46 the units digit and 47 the tens digit chip), a four word register file 48 and a digit character generator 49. The stop flip-flop 45 shown in FIG. 6 is set by the leading edge of the burst pulse output 25 shown in FIG. 5 as it clocks the clock input 50. The output 51 of the stop flip-flop going to the logic high level allows astable oscillator to oscillate at a frequency such that one cycle represents twice the time required for a sonic burst to travel one unit of measurement (foot, yard, meter, etc.) in water by enabling reset input 52. Twice the time is used since the sonic burst must go out and return. The rising edge of the output 53 of the astable oscillator 44 is used to clock the up count input 54 of the units digit counter 46. The overflow 55 of the of the units digit counter is used to clock the up count input 56 of the tens digit counter 47. Thus, after a sonic burst is initiated, the numbers in these decimal counters represent at any given time the number, in the selected units (feet, yards, meters, etc.), of units of distance that the sonic returns would be coming from. The value of these counters is loaded into the first register of register file 48 at the end of the delay one/shot 16 of FIG. 5. This two digit number is diplayed on the CRT screen at location P in FIG. 7. Thus, this number represents the distance from the transducer to the point where data is first stored in memory for each sonic burst. This is seen to be the distance represented by the delay S shown on FIG. 4. The two digit numbers at locations Q, R, and U of FIG. 7 also represnt the distance along the sonic beam from the transducer to the object from which the data returns are displayed at that level. All two digit numbers are updated for each sonic burst. The top number at point P only changes with a change in selection of units or when the top delay is adjusted using potentiometer P5. The numbers at Q, R, and U change with a change in selection of units, with a change of the top delay, and with a change in the range which is controlled by potentiometer P4 shown in FIG. 5. The data for these numbers is not stored in the graphic refresh memory for the CRT display but in the four word register file 48 as shown in FIG. 6. The character generator 49 is fed from the data out of the register file and converts these digit codes to character data which is displayed on the CRT screen. The stop flip-flop 45 of FIG. 6 is cleared by the overflow pulse 35 of the the counter 19 of FIG. 5. The stop Flip-flop 18 when cleared, clears the two counter chips 46 and 47 of FIG. 6.

Figure 7:
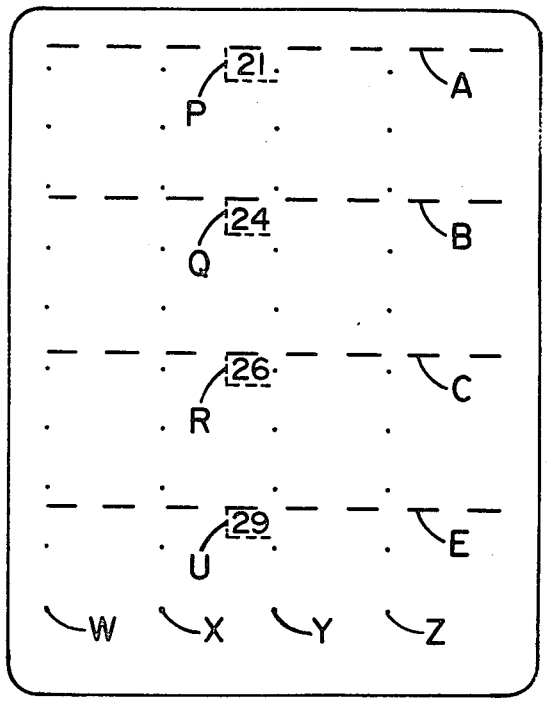
FIG. 7 shows how the specific depth data is displayed on the CRT display.

Another form of depth indicators is also presented on the screen. These are dots which are placed in the image memory at the precise end point of the selected unit of measure. These are located along four vertical lines (W, X, Y, Z) which divide the CRT screen into four equal parts as shown in FIG. 7. These dots are loaded into the image memory only per each 180 degree scan. From these dots, the operator can determine the precise depths of the various objects on CRT screen. The screen is divided into four equal parts with the horizontal dashed lines (A, B, C, and E) as shown in FIG. 7. The CRT screen is oriented with the longest axis representing the depth as shown in FIG. 7, inorder to obtain the maximum possible resolution in this most important parameter. A specific dot in the vertical lines (W, X, Y, and Z) is the closest dot on the given dot matrix to the end point of the selected unit of measure. The value of the two counters 46 and 47 of FIG. 6 is loaded into the file register 48 of FIG. 6 at a time corresponding to the levels A, B, C, and E as shown in FIG. 7. Thus, the dot associated with the level specified by the two digit number in the selected units at location Q of FIG. 7 is the dot just above the the dashed line B. Also, the dot associated with the number at location R of FIG. 7 is the dot just above the dashed line C. Also, the dot associated with the number at location U of FIG. 7 is the dot just above the dashed line E. The dot associated with the number at location P of FIG. 7 is not shown but its relative position above the dashed line A can be estimated by using the spacing of the two consecutive dots below this line.

There are two modes of operation associated with the sector of scan. In the first mode the transducer is rotated back and forth through an angle of 180 degrees 79 of FIG. 8, while the second mode is limited to the adjustable angle 80 of FIG. 8. The sector sensing mechanism consists of the following: an electrical contact 8 which is mounted to the pulley 3 of FIG. 1, two fixed electrical contacts 61 and 58 of FIG. 8 which are mounted directly below pulley 3 on the bracket on which the stepping motor is mounted, two moveable contacts 59 and 60 of FIG. 8 which are also mounted directly below pulley 3, and the electrical wires 62, 63, 64, 65, and 66 of FIG. 8 which carry appropriate signals back to the logic control of the system. In the first mode, the contacts 59 and 60 are disabled. When contact 8 makes connection with contact 61, the signal on line 65 goes to a logic ground due to the fact that contact 8 is tied to logic ground through line 66. This signal causes the control logic to initialize the system which synchronizes this angular position with the data on the right hand side of the screen. It also causes the stepping motor to rotate the shaft 7 of FIG. 1 in the angular direction towards contact 58 of FIG. 8. The control logic should cause the stepping motor to change direction after the pulley 3 has rotated through the angle 79 of 180 degrees. Contact 58 is used in place of a mechanical stop and forces the stepping motor to rotate back in the direction towards contact 61 where the system will again be initialized at contact 61. Line 62 is activated (made logic ground) when contact 8 makes connection with contact 58.

Figure 8:
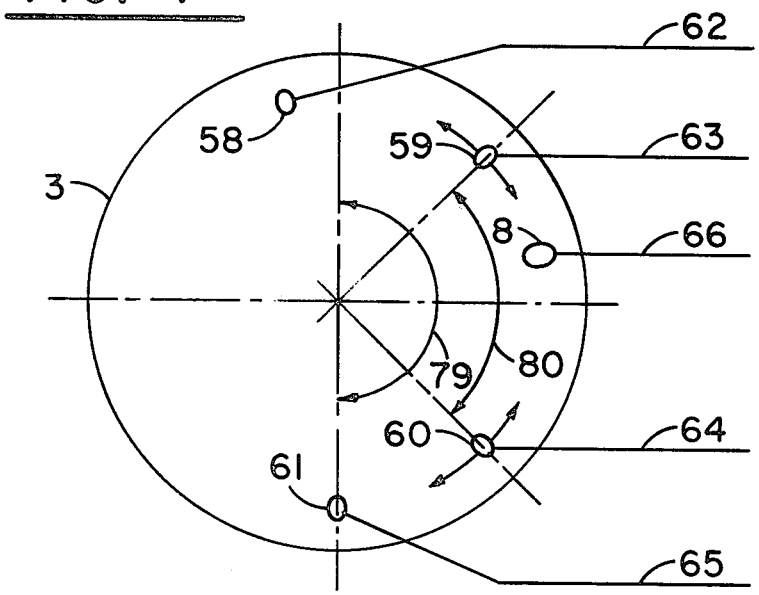
FIG. 8 shows a drawing of the sector sensing and initialization mechanism used to detect and control the angular limits of the scan.

In the limited scan mode, contacts 59 and 60 of FIG. 8 are enabled. In this mode, the stepping motor is allowed to operate such that contact 8 mounted on pulley 3 stays within the sector 80 which is determined by the position of contacts 59 and 60. When contact 8 makes connection with contact 59, the signal on line 63 goes to a logic ground. This causes the stepping motor to reverse direction and rotate back towards contact 60. When contact 8 makes connection with contact 60, the signal on line 64 goes to a logic ground. This causes the stepping motor to reverse direction and rotate back toward contact 59. With the limited sector scan, the data on the CRT screen will also be limited to the corresponding area on the screen. Thus, the operator controls the size of the sector scan by selecting the desired mode and if limited, by the adjustment of contacts 59 and 60 of FIG. 8.

Figure 9:
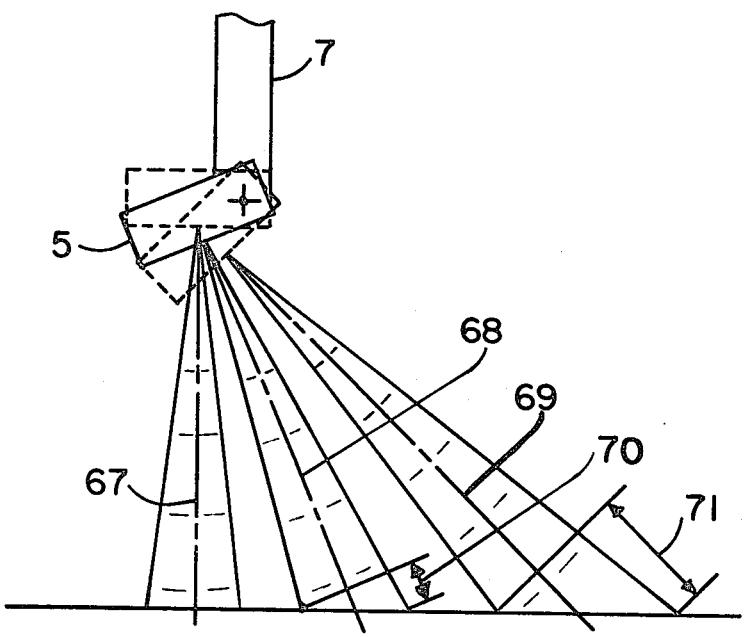
FIG. 9 shows a cross sectional drawing of the sonar beam for several angles of the transducer with respect to its vertical axis.

FIG. 9 shows the cross-section of the sonic beam for several angles of the Transducer 5 with respect to the vertical shaft 7 as shown in FIG. 9. With the transducer adjusted such that the center line of the sonic beam 67 is parallel to the vertical shaft 7, no horizontal directional data is obtained when shaft 7 is rotated since it points to only one spot. With the transducer in this position, the most accurate depth reading to the bottom of a body of water represented by line 67 of FIG. 9 is obtained. With the centerline of the sonic beam not parallel to the vertical axis of the shaft 7, as shown with 68 and 69 of FIG. 9, horizontal directional data is obtained along with the depth data. However, now the bottom returns are spread over a band represented by the segments of length along the beam 70 and 71 of FIG. 9. Thus, the bottom returns will become a wider band on the CRT screen as the angle between the cener of the sonic beam and the axis of the vertical shaft is increased.

Figure 10:
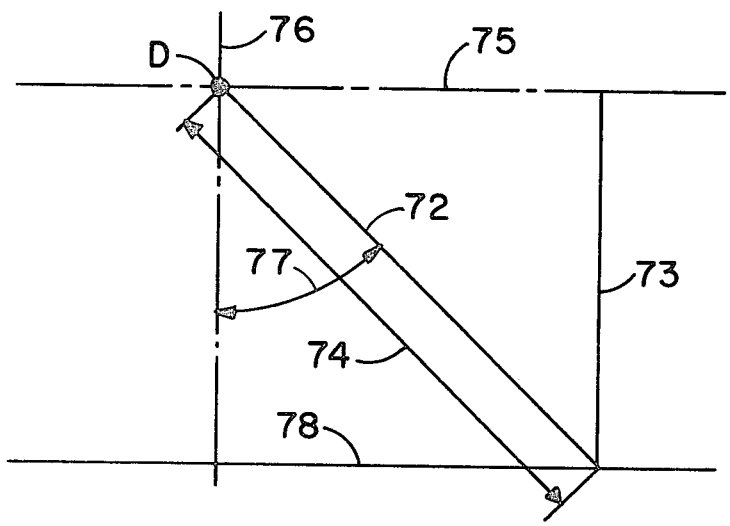
FIG. 10 shows a diagram for the explanation of angle conversion.

With the transducer located at point D and at an angle 77 with respect to the vertical axis 76 as shown in FIG. 10, the vertical distance 73 may be desired. With potentiometer P6 of FIG. 6 set to zero, the depth indicators on CRT screen represent the slant distances along the cone to an object shown on the screen. With this setting of P6, the slant distance is 74 with the center of the beam 72 to the bottom represented by the line 78 of FIG. 10. The slant distance indicators are in the selected unit of measure. By calibrating the setting of potentiometer P6 and setting it to the value corresponding to a given angle 77, one can get a direct reading of the vertical depth of an object with the new values of depth indicators on the CRT screen. This potentiometer setting is continuously variable and can correspond with angles 77 of FIG. 10 from zero to approximately 70 degrees. With an angle 77 of 90 degrees the vertical depth becomes 0 and the slant depth equals the horizontal distance.

Figure 11:
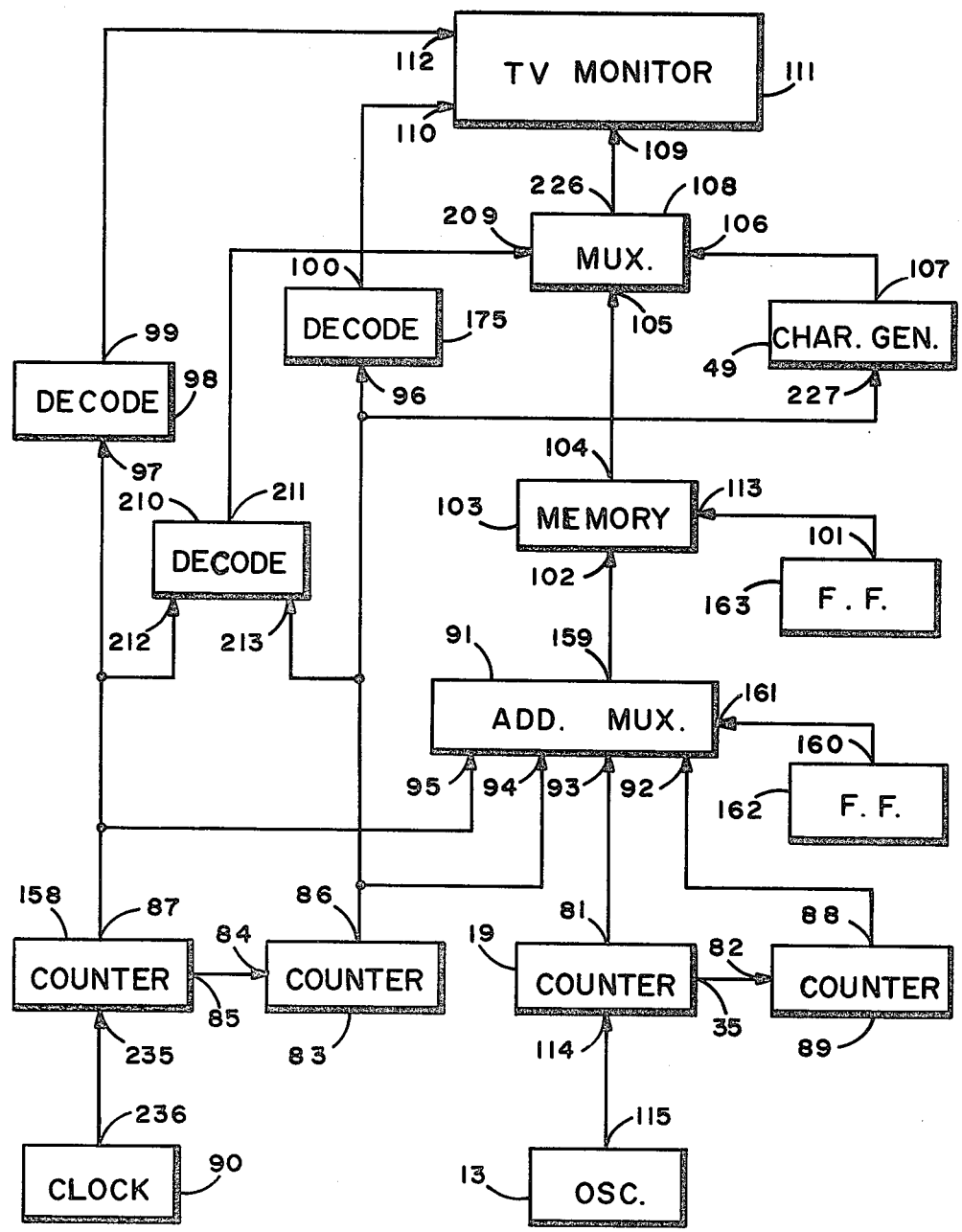
FIG. 11 is a schematic diagram of the control logic for the control of the CRT Display and shows its relation to the Image Memory.

FIG. 11 shows the logic schematic diagram of the control logic for the control of the CRT Display (TV Monitor). It includes the TV Monitor 111, a crystal clock 90, the refresh column and row counters 158 and 83, the horizontal sync decode 98, the vertical sync decode 175, a controlled astable oscillator 13, the entry column and row counters 19 and 89, the Image Memory (Display Refresh Memory) 103, the memory address multiplexer 91, a D type flip-flop 162 used as a write flip-flop, a D type flip-flop 163 used as a data flip-flop, a character generator 49 used to generate the numeric characters, a multiplexer 108 used to direct the proper video data to the TV Monitor and the select decode 210 which is used to select the proper video data. The CRT display screen of the TV Monitor 111 for this example of the invention has a matrix of 256 by 256 addressable points. The Image Memory 103 is made up of four memory chips each of which have 16,384 memory cells (bits). This is the amount of memory required to have one memory cell (bit) for each point of the CRT screen matrix. The memory is addressed via an eight bit column and an eight bit row address 159 which is the output of the memory address multiplexer 91. This address output 159 drives the Image Memory address input 102. The control of the TV Monitor 111 is accomplished via three control signals. The first is the horizontal sync signal 99 which is generated by the horizontal sync decode 98. This signal enters the TV Monitor 111 at the horizontal sync input 112 and controls the horizontal sweep of the TV Monitor. The second is the vertical sync signal 100 which is generated by the vertical sync decode 175. This signal enters the TV Monitor 111 at the vertical sync input 110 and controls the vertical retrace of the TV Monitor. The third is the video data signal 226 which is the output of the video data multiplexer 108. This signal enters the TV Monitor 111 at the video data input 109 and controls the data presentation on the CRT screen. The data into the video multiplexer 108 comes from two sources. The first is the Image Memory video output 104 and enters the multiplexer 108 at its video input 105. The second is the character video output 107 and enters the video multiplexer 108 at its video input 106. Thus, the data on the the CRT display screen is made up of data from the Image Memory 103 and from data from the character generator 49.

From FIG. 11, the crystal clock 90 has a fixed frequency output 236 which is used to clock the clock input 235 of the refresh column counter 158. The overflow output 85 of the refresh column counter 158 is used to clock the input 84 of the refresh row counter 83. The output 87 of the column refresh counter 158 is used by the horizontal sync decode 98 to generate the horizontal sync 99 and enters this decode at input 97. The outupt 86 of the row refresh counter 83 is used by the vertical sync decode 175 to generate the vertical sync 100 and enters this decode at input 96. The output 87 of the refresh column counter enters input 95 of the memory address multiplexer 91. The output 86 of the refresh row counter 83 enters input 94 of the memory address multiplexer 91. The output 115 of oscillator 13 is used to clock input 114 of the entry column counter 19. The overflow output 35 of the entry column counter is used to clock the clock input 82 of the entry row counter 89. The output 81 of the entry column counter 19 enters input 93 of the memory address multiplexer 91. The output 88 of the entry row counter 89 enters input 92 of the memory address multiplexer 91. The output 159 of the memory address multiplexer 91, thus, contains either the refresh column and row address or the entry column and row address. The selection of the address is controlled by the write flip-flop 162. Its output 160 is used to drive the select input 161 of the address multiplexer 91. The write flip-flop is controlled such that the refresh column and row address is selected except when an Image Memory 103 write is performed. During a write memory operation the data to be written into the memory is held in the data flip-fop 163. Its output 101 is used to drive the data input 113 of the Image Memory 103. During a write memory operation the entry column and row address are selected to address the Image Memory 103. The output 87 of the refresh column counter 158 enters input 212 of the select decode 210. The output 86 of the refresh row counter enters input 213 of the select decode 210. The output 211 of the select decode 210 is used to select the proper video data by controlling the select input 209 of the video multiplexer 108. The data on the CRT display screen is made up of data from the Graphic Memory 103, with a logical one (1) in a given memory cell representing a visible dot on the screen, or from data from the character generator 49 which is entered at fixed locations on the CRT screen as shown in FIG. 7. These fixed locations on the CRT screen for the numeric characters are determined by the select decode 210 as shown in FIG. 11. The output 86 of the refresh row counter 83 drives the row decode input 227 of the character generator 49. This input is used to select the proper row of the characters being displayed at these fixed locations.

Figure 12:
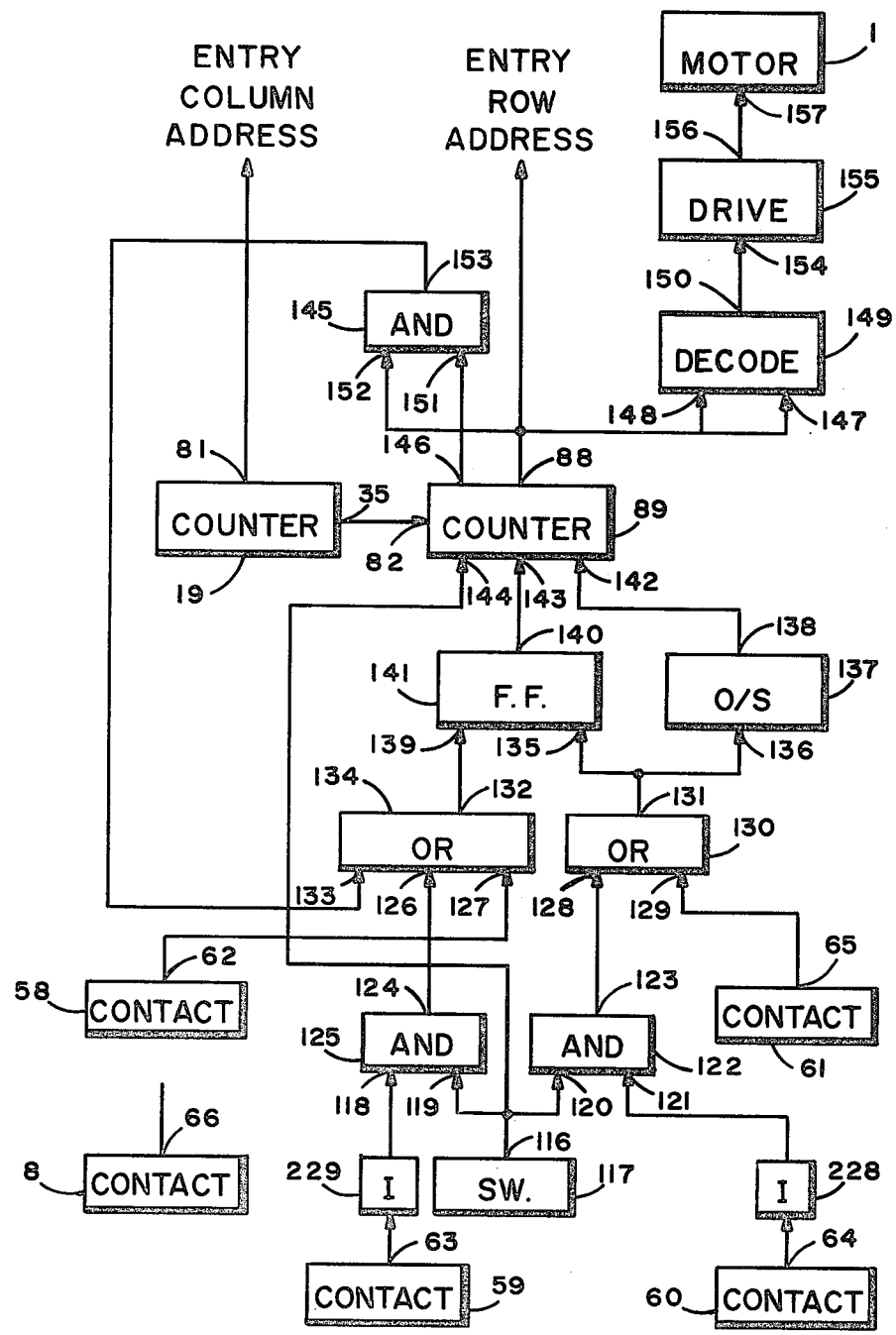
FIG. 12 is a schematic diagram of the control logic for control of the stepping motor and shows how it interfaces to the rest of the system.

From FIG. 12, the logic schematic diagram of the control logic for the control of the stepping motor and how it interfaces to the rest of the system is shown. The following describes the open loop drive system which does not require positional feedback for normal operation. It includes the stepping motor 1, the motor drive 155, the motor drive decode 149, the entry column counter 19, the entry row counter 89, an "and" gate 145, a set-reset type flip-flop 141 used as an up/down control of the entry row counter 89, a one shot 137 used to load the entry row counter 89, an "or" gate 130 used to trigger one shot 137 and to reset flip-flop 141, an "or" gate 134 used to set flip-flop 141, a left electrical contact 58, an electrical contact 8 which is mounted on pulley 3 as shown in FIG. 1, an electrical left moveable contact 59, an electrical right moveable contact 60, a disable switch 117 used to disable the left and right moveable contacts, an "and" gate 125 used to disable the left movable contact 59, an "and" gate 122 used to disable the right moveable contact 60, an electrical right contact 61 and two inverters 227 and 228 which are used to invert signals. The stepping motor 1 is controlled completely by the binary up/down entry row counter 89. The two lowest order bits of the 8 bit row address at output 88 of the entry row counter are inputed to the motor drive decode 149 at inputs 147 and 148. The rotation direction of the stepping motor 1 is dependent on the state of the up/down entry row counter 89. The state can either be in the count up mode or in the count down mode which is controlled by the output 140 of the up/down flip-flop 141. This output 140 drives the up/down control input 143 of the entry row counter 89. Thus, when the entry row counter 89 is counting up the stepping motor 1 will rotate in a specified direction and when the entry row counter is counting down the motor will rotate in the opposite direction. The output 150 of the motor drive decode 149 is used to drive the four bases 154 of the drive transistors of the motor drive 155. The motor 1 is driven in the standard four phase mode for stepping motors which gives the maximum drive power available. The motor drive is transmited to the stepping motor 1 via the output cable 156 of the motor drive and connects to the motor at the motor input 157. The clock input 82 of the entry row counter 89 is clocked by the overflow output 35 of the entry column counter 19. This overflow output pulse 35 occurs at the end of data entry into the Image Memory 103 for each Sonic Burst. Thus, the transducer 5 is rotated through one step by the stepping motor 1 for each Sonic Burst in the rotational direction controlled by the logic level at the up/down input 143 of the entry row counter. If the up/down input 143 is low (logic 0) the entry row counter will count up when clocked at clock input 82. If this input 143 is high (logic 1) the counter 143 will count down when clocked at clock input 82.

FIG. 12 and FIG. 8 will be used to explain the correspondence between the pulley 3 rotational direction which has electrical contact 8 mounted to it and the direction of count of the entry row counter 89. The rotational direction of the pulley 3 is the same as that of the stepping motor 1. FIG. 8 is a top view of the pulley 3 and the contacts used to control the direction of count of the entry row counter 89. To explain the normal 180 degree rotation of the pulley 3, we will assume that the disable switch 117 is in the position to disable the left and right moveable contacts 59 and 60. The pulley 3 is restricted to rotate such that electrical contact 8 remains on the arc between electrical contacts 61 and 58 as shown in FIG. 8. When the entry row counter 89 is counting down the pulley 3 with contact 8 will be rotating clockwise when viewed from the top. As the pulley is rotated clockwise, the electrical contact 8 will eventually make contact with the right electrical contact 61. Contact 8 is tied to the electrical ground of the system via cable 66. Thus, when contact 8 makes contact with the electrical right contact 61, this contact 61 will be forced to ground. This ground (logical 0) is transmitted over cable 65 to input 129 of "OR" gate 130. The output 131 of "OR" gate 130 then drives the input 135 of the up/down flip-flop 141 and input 136 of one/shot 137 to a logic low (0) level. This resets flip-flop 141 such that its output 140 will go from a logic high (1) to a logic low (0) and also triggers one/shot 137 so as to provide a logic low pulse at its output 138. This output pulse 138 is used to load the entry row counter 89 by clocking the load input 142 of this counter in FIG. 12. The value loaded into the entry row counter 89 is all logic lows (0) which initialize this counter to zero. This establishes the correspondence of the transducer direction at its futherest clockwise rotation with the data being entered on the right hand side of the CRT screen since the row address of zero represents the row on the right hand side of the screen. With the up/down input 143 now low the entry row counter 89 will now count up when clocked at its clock input 82. The entry row counter 89 counting up will cause the stepping motor 1 to be driven counter clockwise which will drive the pulley 3 counter clockwise also. This will cause contact 8 to move away from contact 61 and towards contact 58. The diameter of the drive spool 2 of FIG. 1 and the diameter of pulley 3 is such that after 256 steps of the stepping motor 1 the pulley 3 will have rotated through 180 degrees and the value in the entry row counter 89 will be all bits high (logical 1). With the entry row counter 89 at its maximum value (all bits high) the control output 146 will go to the logic high level which indicates maximum or minimum value for counter 89. This output 146 is used to drive input 151 of "AND" gate 145. The highest order bit of the entry row counter 89 is used to drive input 152 of "AND" gate 145. Thus, the output 153 of "AND" gate 145 will go to a logic low (0) level when the entry row counter 89 is at its maximum value. This output 153 drives input 133 of "OR" gate 134. This causes the output 132 of "OR" gate 134 to be driven to a logic low (0). This causes the output 132 to drive the input 139 of the up/down flip-flop 141 to a logic low (0) level. This logic low level at input 139 causes the flip-flop 141 to be reset. This causes the output 140 to go to a logic high (1) level. This high level on output 140 drives input 143 of the entry row counter 89 to a logic high level. The entry row counter will now count down when clocked at its clock input 82. Thus, the direction of rotation of pulley 3 is changed when the entry counter 89 has counted up to its maximum value. The maximum value should occur when contact 8 has rotated through the angle 79 of 180 degrees away from contact 61 as shown in FIG. 8. The left contact 58 has a chance of being reached by contact 8 during initial power turn on since the right contact 61 may have not yet initialized the system. This may also happen if something should bump the transducer 5 such that the initialization by the right contact 61 is temporarily caused to be out of syncronization. If contact 8 should contact the left contact 58, this will cause a logic low (0) to be transmitted via cable 62 to the input 127 of "OR" gate 134. This will cause the output 132 to drive the set input 139 of the up/down flip-flop to a logic low (0). This in turn will cause the output 140 of this flip-flop to go to the logic high (1) level. This output 140 will then drive the input 143 of the entry row counter 89 to a logic high (1) level which will cause this counter to count down when clocked at its clock input 82. This will cause the pulley 3 to rotate clockwise thus moving contact 8 away from contact 58. It is seen that the system is initialized every time contact 8 makes contact with the right contact 61 when it is in this 180 degree mode.

From FIG. 12, the system is placed in the limited scan mode by placing the disable switch 117 in the non-disable position. This allows the signals from the two moveable contacts 59 and 60 to become active in the control of the state of the up/down flip-flop. The explanation of the limited scan mode is very similar to that of the full 180 degree scan mode. The left and right moveable contacts 59 and 60 are adjustable by the operator before operation of the system. During operation they will be set at some angular separation 80 such as shown in FIG. 8. All input data bits to the entry row counter 89 are grounded to the system logic ground except bit 6 which is the second most significant bit and shown as input 144 of the entry row counter shown in FIG. 12. This bit is tied to one side 116 of the disable switch. Thus, when the disable switch 117 is set for the limited mode, the input 144 of the entry row counter 89 is at a logic high (1) level. When the disable switch 117 is set for the normal 180 degree mode, this input 144 is at a logic low (0) level. When the system is in the limited mode the right moveable contact 60 will initialize the entry row counter 89 to the binary value of 64 which is one fourth of the allowable counting range of this 8 bit counter. This represents the row which is one fourth of the way in from the right hand side of the CRT screen. Thus, the data from the limited scan mode will appear on the screen from this row and to the left an amount corresponding to the angular separation 80 of the moveable contacts. In this limited mode, when contact 8 makes contact with the right moveable contact 60, a logic low (0) is transmitted via cable 64 to an inverter 228 which drives the input 121 of "AND" gate 122 to a logic high (1) level. This input 121 is anded with the logic high (1) on input 120 to give a logic low (0) on the output 123 of "AND" gate 122. This output 123 drives the input 128 of "OR" gate 130 in a similar manner as was described for the right contact 61 in the 180 degree mode. When contact 8 makes contact with the left moveable contact 59 a logic low is transmitted via cable 63 to an inverter 229 which drives the input 118 of "AND" gate 125 to a logic high (1) level. This input is anded with the logic high (1) on input 119 to give a logic low (0) on the output 124 of "AND" gate 125. This output 124 drives the input 126 of "OR" gate 134 in a similar manner as was described for the left contact 58 and the output of "AND" gate 145 for the 180 degree mode. The preferred embodiment is to have the right moveable contact 60 to be a fixed contact which is located 45 degrees counterclockwise from the right contact 61 so that the same correspondence of data on the screen is maintained for both modes.

Figure 13:
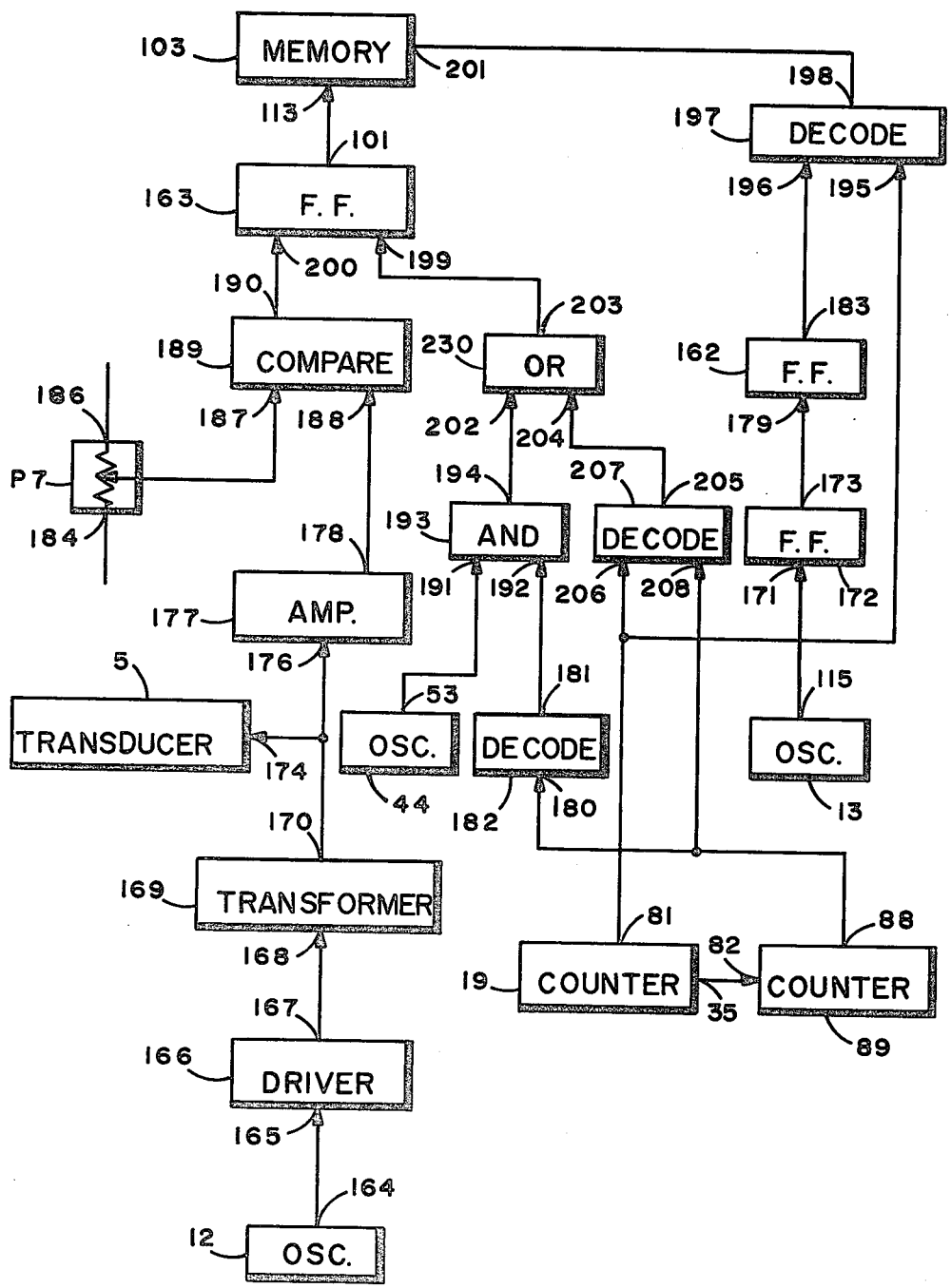
FIG. 13 is a schematic diagram of the logic and components used to drive the transducer and receive echos and the logic to generate the lines and dots as depicted in FIG. 7.

FIG. 13 shows the schematic diagram of the logic and components used to drive the transducer and receive and amplify echoes and the logic used to generate the lines and dots as depicted in FIG. 7. It includes the Image Memory 103, a D type flip-flop 163 used as a data flip-flop, a comparitor 189 which compares the amplified incoming signal level with that of a reference level set by potentiometer P7, an amplifier 177 which amplifies the incoming echo return signals, a transducer 5 which is used to send out a burst of sonic energy and to receive the returned echoes, a transformer 169 which is used to drive the transducer and receive the return signals, a transducer driver 166 which drives the transformer 169 which drives the transducer 5, a controlled astable oscillator 12 whose output is used to control the transducer driver 166, an "OR" gate 230 which is used in setting of data into the data flip-flop 163, an "AND" gate 193 used to control the depth dots which are entered into the Image Memory 103, a controlled astable oscillator 44 which is used to put the depth dots in the Image Memory at the appropriate time, a row decode 182 which is used to select the proper row for entry of the depth dots, the entry row counter 89 which is needed for several decodes, the entry column counter 19 which is used for several decodes, a dash line decode 207 which is used to enter the data into the Image Memory 103 which is associated with the horizontal dashed lines as shown in FIG. 7, a write decode 198 which is used for the control of the writing of data into the Image Memory 103, a D type flip-flop 162 which is used to enable the write decode 197, a D type flip-flop 172 which is used as a data available flip-flop which controls when data should be entered into the Image Memory 103 and a controlled astable oscillator 13 which is used to clock the data available flip-flop at the appropriate time.

From FIG. 13 the output 164 of the controlled astable oscillator 12 is used to to drive the input 165 of the transducer driver 166. The output 167 of the transducer driver is used to drive the transformer 169 whose output 170 drives the transducer 5. The echoes are received by the tuned circuit formed by the transducer 5 and the transformer 169 secondary winding. This received echo signal is then fed into the input 176 of the tuned circuit amplifier 177 whose output 178 drives the input 188 of the voltage comparator 189. This level is compared with the operator set level at at the other input 187 of the comparator. The terminal lead 184 of potentiometer P7 is tied to the logic ground of the system while terminal lead 186 is tied to positive DC voltage such as 12 VDC. The operator can, thus, adjust the DC voltage at input 187 of the voltage comparator from ground up to the value of the positive DC voltage by turning the knob associated with this potentiometer P7.

From FIG. 13 the output of the comparator 190 is used to drive the input 200 of the data flip-flop 163 so as to set the flip-flop if an echo is received. The data flip-flop output 101 then presents this data to the data input 113 of the Image Memory 103. The controlled astable oscillator 13 is used to control how often and when data should be loaded into the Image Memory 103. The output 115 of this oscillator is used to clock the clock input 171 of the data available flip-flop 172. The output 173 of the data available flip-flop 172 is used to drive the D input 179 of the write flip-flop 162. Internal clocking clocks this logic high (1) on input 179, which indicates the data available flip-flop is set, into the write flip-flop at the appropriate time in order to synchronize the memory write cycle with internal timing. The output 183 of the write flip-flop is used to enable the write code 197 by driving input 196 to a logic low (0) level thus enabling the write decode. The write memory cycle will write into only one memory cell. Since their are four memory chips in the Image Memory 103, two bits are required to specify which memory chip is to be written into. These two bits come from the two lowest order bits of the entry column counter output 81. These two bits enter the write decode 197 at input 195. The four horizontal dashed lines on the CRT display screen as depicted in FIG. 7 are generated by the dash line decode 207 as shown in FIG. 13. The input 208 of the decode comes from the output 88 of the entry row counter 89 while the input 200 of the decode comes from output 81 of the entry column counter 19. The output 205 of the dash line decode 207 is used to drive the input 204 of "OR" gate 230. The output 203 of the "OR" gate 230 is used to clock the clock input 199 of the data flip-flop 163. A clock on this input 199 will set the data flip-flop so as to load a logic high (1) into the Image Memory 103. The dash line decode is such as to generate the proper clocking of the data flip-flop in order to enter the required data, for the four dashed lines which are displayed on the CRT screen, into the Image Memory 103. The depth dots as depicted in FIG. 7 are only entered in four vertical columns. The selection of these vertical columns is accomplished by the use of row decode 182 as shown in FIG. 13. The input 180 to the row decode 182 is the output 88 of the entry row counter 89. The output 181 of the row decode 182 is anded with the output 53 of the controlled astable oscillator 44. This logic anding is done with "AND" gate 193 whose inputs are 191 and 192. The output 194 of this "AND" gate is used to drive input 202 of "OR" gate 230. As mentioned previously the output 203 of "OR" gate 230 clocks the clock input 199 of the data flip-flop. Thus, oscillator 44 controls the precise spacing of the dots in a vertical column.

Figure 14:
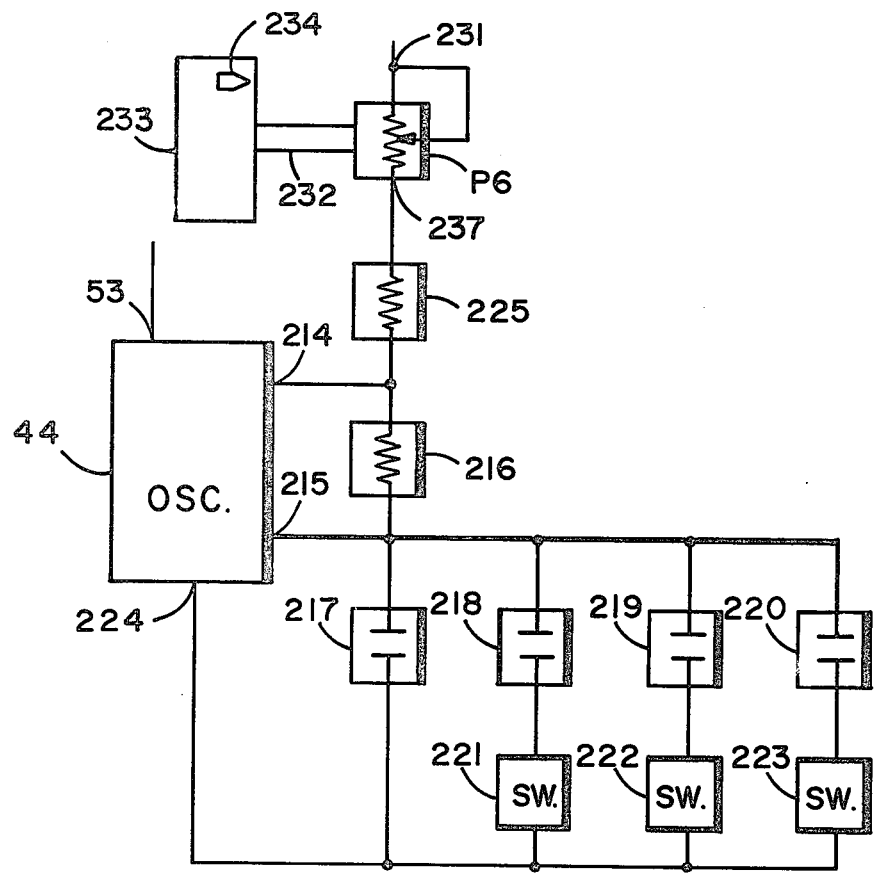
FIG. 14 is a logic diagram showing the control used for angle conversion and the timing components and switches used to change the scale factor of the system.

FIG. 14 shows the schematic diagram of the logic and components used for the control of angle conversion and the timing components and switches used to change the scale factor of the system. It includes a controlled astable oscillator 44, a potentiometer P6 of total resistance value R0 with shaft 232 and dial knob 233, a fixed resistor 225 of resistance value R1, a fixed resistor 216 of resistance value R2, a fixed capacitor 217 of capacitance value C1, a fixed capacitor 218 of capacitance value 2(C1), a fixed capacitor 219 of capacitance value 0.281(C1), a fixed capacitor 220 of capacitance value 2.719(C1), a toggle switch 221, a toggle switch 222 and a toggle switch 223. The period of oscillation of this oscillator 44 is used to represent twice the distance, in a given unit of measure, that sound will travel in water. The distance is twice, since the sonic burst must go out and also return from a given object. How this oscillator is used to put depth dot indicators on the CRT screen has been previously described. The oscillator 44 is an industrial timmer chip whose period (T) of oscillation is given by the following equation.

$$T = 0.693(R_a + 2R_b)C$$

where Ra is the resistance value between terminal 231 of potentiometer P6, which is at a +DC voltage, and the discharge terminal 214 of oscillator 44, where Rb is the value of resistance between terminal 214 and the threshold terminal 215 of oscillator 44, and C is the value of capacitance between terminal 215 and the ground terminal 224 of oscillator 44. The implementation of the angle conversion feature requires an adjustable resistance value and a fixed value of resistance between the +DC voltage at 231 and the discharge input 214 of oscillator 44. These are potentiometer P6 amd fixed resistor 225. It also requires a dial knob 233 which is used to rotate the shaft 232 of the potentiometer P6. It also requires an index mark 234 on the dial knob and panel markings which have been calibrated for various angles of the transducer with respect to the vertical.

Figure 15:
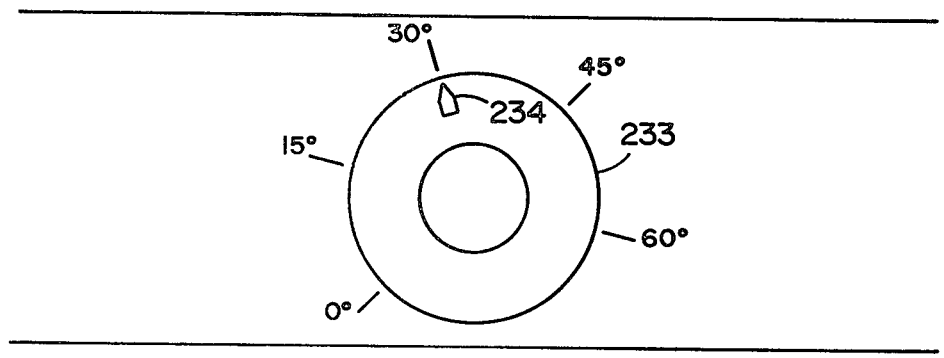
FIG. 15 is a diagram showing a typical calibrated panel for use with the angle conversion functions of the system.

FIG. 15 shows the type of panel markings which are used. In the non-angle conversion mode, the dial knob 233 is in its most counterclockwise position. In this position the timing components are calibrated to read the slant depth (distance along the axis of the sonic beam) in the unit of measure as determined by the switch selection. For the foot as the unit of measure, the switches 221, 222, and 223 will be set to their open position. Thus, the period T (foot) will be given by the following equation:

$$T\,(foot) = 0.693[R1 + 2(R2)]C1$$

For the yard as the unit of measure, switch 221 is closed with switches 222 and 223 open. Thus, the period T (yard) will be given by the following equation:

$$T(yard) = 0.693[R1 + 2(R2)][3(C1)]$$

For the meter as the unit of measure switch 221 and 222 are closed, while switch 223 is open. Thus, the period T (meter) is given by the following equation:

$$T(meter) = 0.693[R1 + 2(R2)][3.281(C1)]$$

For a larger unit of measure such as a fathom, an additional capacitor 220 can be added to the circuit by closing switch 223 with switches 221 and 222 also closed. Thus, the period of oscillation T (fathom) is given by the following equation:

$$T(fathom) = 0.693[R1 + 2(R2)][6(C1)]$$

Thus, the implementation of the desired scale (units of measure) of the system is accomplished by setting the appropriate switches to the required states. More scales could be implemented by adding more fixed capacitors with their associated toggle switches. The capacitor values in the above equations are calibrated to give the desired time period for each unit of measure. The range over which angle conversion can be implemented depends on the amount that the period of oscillation can be increased when changing the value of resistance across potentiometer P6 from its minimum, zero value, to its maximum value. A typical change in the period of oscillation is of the order of a factor of 3. The oscillation period must increase by a factor equal to to the reciprocal of the cosine of the angle 77 as shown in FIG. 10 to have the numeric characters and depth dots to represent the vertical depth 73. The factor of 3 allows conversion of angles up to approximately 70 degrees.

Figure 16:
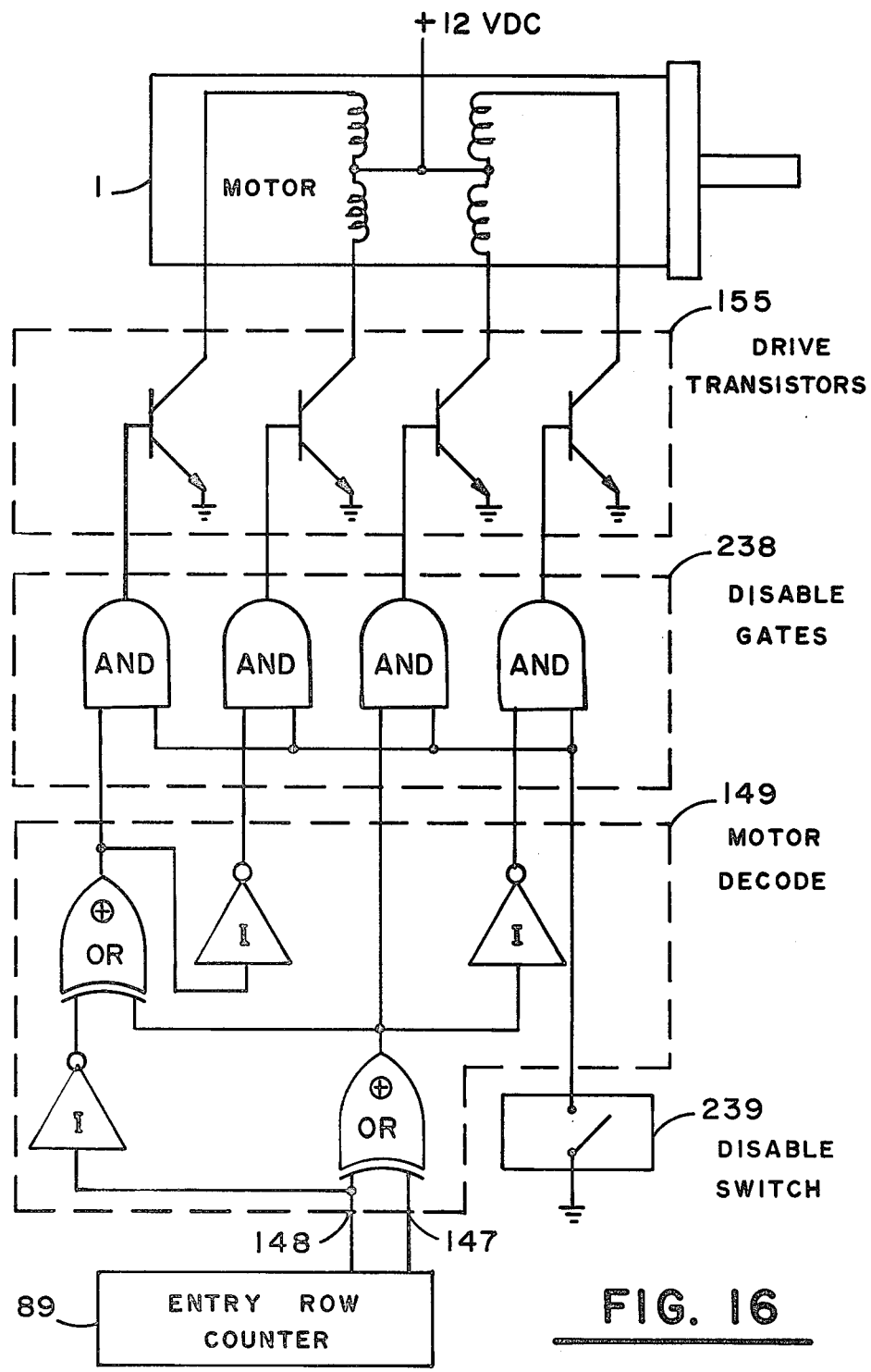
FIG. 16 shows the logic and circuitry used to drive the stepping motor.

FIG. 16 shows the logic and circuitry used to drive the stepping motor of the scanning mechanism. It includes the stepping motor 1, the motor drive transistors 155, a set of disable gates 238, a disable switch 239, the motor drive decode 149, and the entry row counter 89. The stepping motor 1 uses unipolar windings which has 2 coils wound on the same bobin per stator half. The use of the unipolar winding, simetimes called bifilar winding, allows the use of simple drive circuitry and the timing is not as critical to prevent a current short through two transistors as is possible with bipolar drive. The stepping motor is operated in the normal 4 step sequence which is understood by those familar with the art. A detailed description of the various types of stepping motors and there drive requirements can be found in "Stepper Motor Handbook" from North American Philips Controls Corp. Cheshire, Conn. current in 1979. The motor decode 149 which includes two exclusive "OR" gates and three inverters is used to decode the two least significant bits of the entry row counter 89. The least significant bit (bit 0) enters the motor decode 149 at input 148. The next least significant bit (bit 1) enters at input 147. The output of the motor decode 149 provides the necessary logic signals at the input of the set of disable gates 238. This data is transmitted to the output of the disable gates which drives the four bases of the motor drive transistors 155. Closing of the disable switch 139 disables the motor drive since this shuts off all of the drive transistors 155. From this FIG. 16 we see that the stepping motor is controlled completely by the output of the Entry Row Counter 89.

Figure 17:
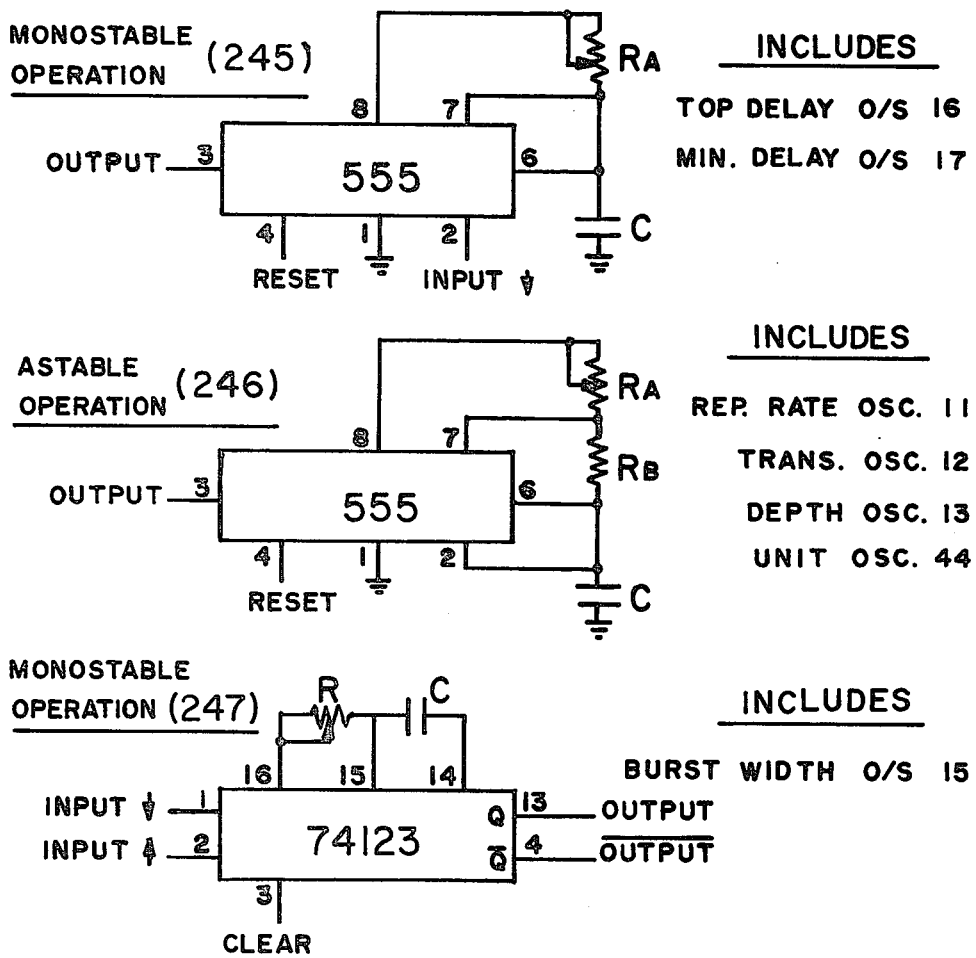
FIG. 17 shows the circuits and typical components values used for the mono-stable and astable oscillators of the system timing ring.

FIG. 17 shows the circuits and typical component values used for the monostable and astable oscillators of the system timing ring. The two types of integrated circuits used are the 555 industrial timer chip and the 74123 dual retriggerable monostable oscillator with clear. The chips are shown with there standard pin numbers. The circuit configuration for the monostable operation 245 uses the 555 timer chip with its associated timing components. In this configuration the discharge terminal 7 is tied to the threshold input 6. The resistor RA is variable which allows for the adjustment of the time of the one/shot. The trigger input is pin 2 of the timer chip. This circuit configuration is used with the top delay one/shot 16 and the minimum delay one/shot 17.

The circuit configuration for the astable operation 246 uses the 555 timer chip with its associated timing components. In this configuration the trigger input 2 is tied to the threshold input 6. The resistor RB is connected between the threshold input 6 and the discharge input 7. The values of RB for the system timing ring oscillators are fixed while the values of RA are variable inorder for the operator to adjust the oscillators to the desired frequencies. This circuit configuration is used with the repetition rate oscillator 11, the transducer frequency oscllator 12 and the depth (range) oscillator 13.

The circuit configuration for the monostable operation 247 uses the 74123 monostable oscillator chip and its associated timing components. The value of the resistor R is variable so that the operator can adjust the burst width of the sonic pulse. The one/shot can be triggered either by a down going pulse on pin 1 or by an up going pulse on pin 2.

The Table of Values 248 shows typical values for the timing components used in the system timing ring. The switching in of additional parallel capacitors associated with the unit oscillator 44 for changing the units of measure was expained precviously.

Figure 18:
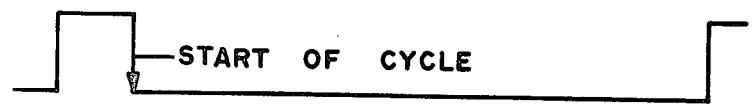
FIG. 18 shows typical wave forms of the various oscillators of the timing ring for a given single sonic burst and data recovery period.
Figure 18:
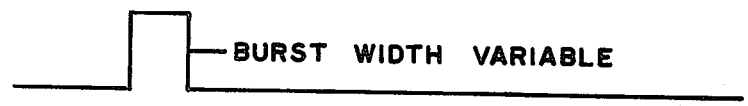
Figure 18:
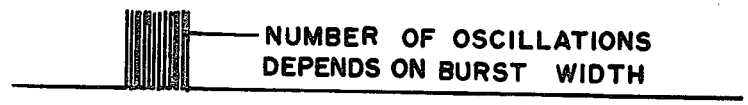
Figure 18:
Figure 18:
Figure 18:
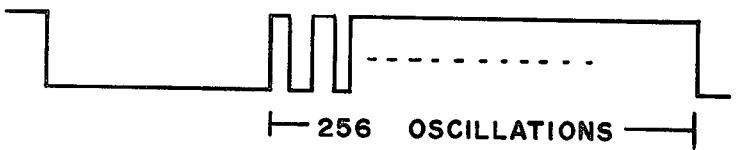

FIG. 18 shows typical forms of the various oscillators of the timing ring shown in FIG. 5 for a given sonic burst and data recovery period. The down going edge of output 20 of the repetition rate oscillator 11 is the start of the sequence of events for a given sonic burst and data recovery period. This down going edge triggers one/shot 15 which produces a pulse at output 25 which is the burst width. The burst width pulse allows the transducer frequency oscillator 12 to oscillate at the frequency which is tuned to the mechanical oscillating frequency of the transducer. The number of oscillations of oscillator 12 depends on the burst width.

The complementary output 22 of the burst width oscilator 15 triggers one/shot 16 whose output 28 is called the top delay. This occurs at the same time as the down going edge of output 20 of oscillator 11. The down going edge of output 28 of top delay one/shot 16 clocks the start flip-flop 18 and sets its output 32 to the on state. The output 32 in the high (on) state allows oscillator 13 to oscillate at the rate which is the sampling time for the return sonar data. This oscillator will increment the entry column counter 19 a total of 256 times at which time it will over flow and clear the start flip-flop. The clearing of the start flip-flop then allows oscillator 11 to oscillate which starts a new cycle.

Figure 19:
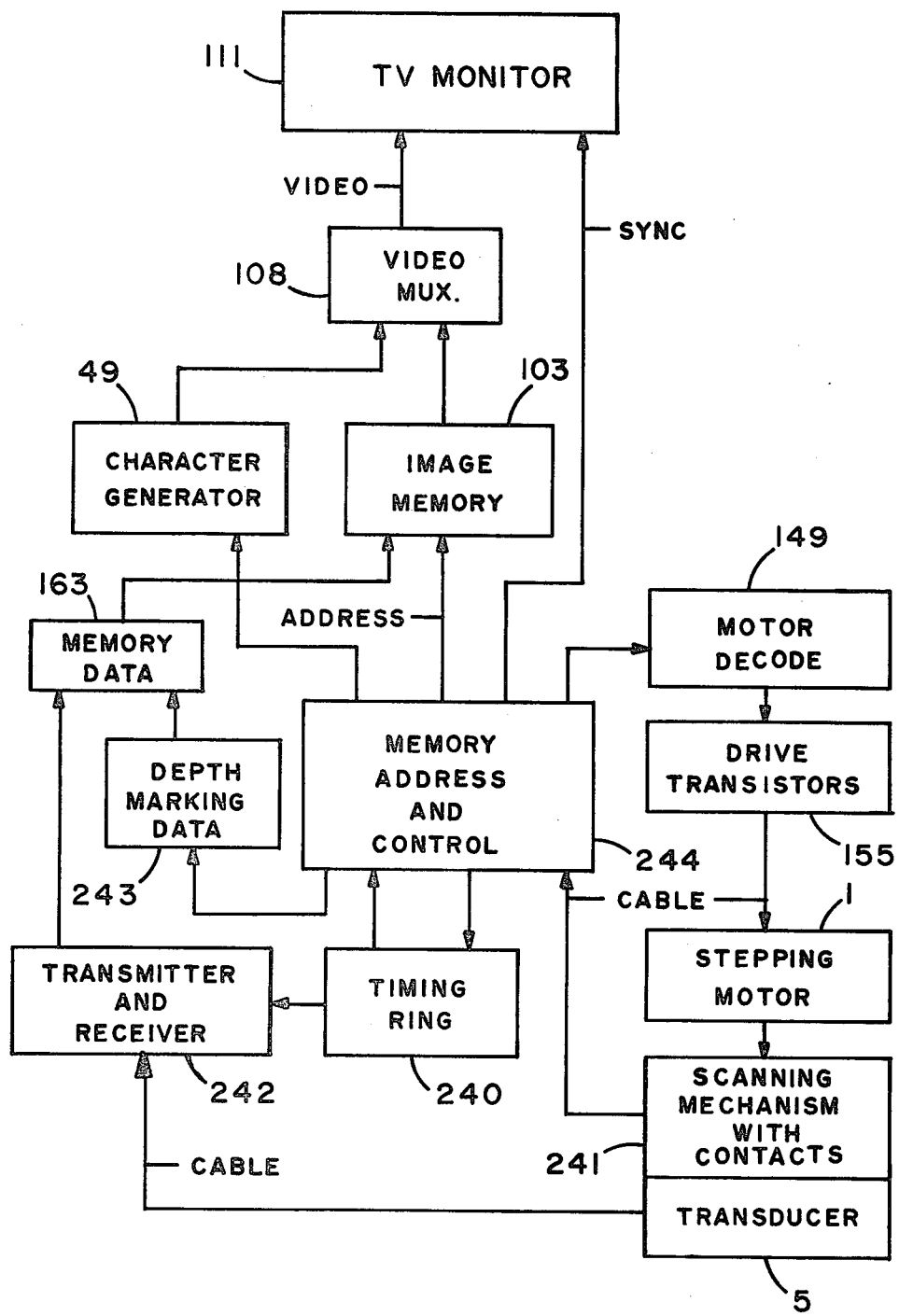
FIG. 19 shows an overall functional block diagram of the Scanning Sonar Display System.

FIG. 19 shows an overall functional block diagram of the Scanning Sonar Display System. A detailed description of the various functions has already been given. Sonar and related data is stored in the image memory 103. This memory data along with numeric data from chracter generator 49 is multiplexed via mux 108 to the video input of the TV monitor 111. The memory address and control 244 generates the horizontal and vertical sync signals required by the TV monitor 111. The output of the entry row counter drives the motor decode 149 which controls the motor drive transistors 155. The stepping motot 1 drives the scanning mechanism 241 on which the transducer and contacts are mounted. The contact signals are sent back to control the direction of the up/down entry row counter. The timing ring 240 initiates the transmiter and receiver 242 to drive and receiver data from transducer 5. This sonar data along with the depth markings 243 are stored in the image memory 111 of the scanning sonar display system.

It is understood that the forms of the invention shown and described herein are but preferred embodiments thereof and that various changes may be made therein without departing from the spirit or scope of the invention.

We claim:

1. A scanning sonar display system for the purpose of detecting and locating fish, determining bottom terrian, a navigational aid and the detection and location of submerged objects which said system includes a TV monitor to display sonar images, a stepping motor, a sector scanning mechanism having contacts, a transducer with drive and receive circuitry, an image memory to store scanned data from the transducer, an entry memory address counter for loading sonar data taken from the transducer in the image memory, a refresh memory address counter which derives timing pulses for the TV monitor and addresses the image memory so that the image can be refreshed on the TV monitor, control and timing circuitry, the improvements comprising: means including said stepping motor providing a drive system for the TV monitor and transducer; means connecting said stepping motor to said transducer; means for providing sector control of said scanning mechanism; means for moving the transducer to provide sonar data mapped from a truncated cone to x-y presentation on said TV monitor; means for refreshing and loading the image memory by use of said refresh memory address counter and said entry memory address counter; means for continuous adjustment of a top delay, of range, of repetition frequency and of sonic burst width while still providing for maximum scan rate; means for presenting depth and directional data on said TV monitor; and means for converting slant distance to vertical distance and selecting the desired unit of measure.

2. A scanning sonar display system as set forth in claim 1 in which said stepping motor has motor drive decode circuitry, and in which angular correspondence of sonar data as it is portrayed on the TV monitor is assured by open loop drive means, said open loop drive means including said entry memory counter, motor drive decode circuitry, stepping motor, and sector scanning mechanism, said open loop drive means providing correspondence of the sonar data on said TV monitor received from said transducer by connecting the motor drive circuitry of said stepping motor directly to the two least significant bits of the row count of said entry memory address counter with the boundary initialization accomplished by the loading of a constant into the row count of said entry memory address counter at the appropriate time as determined by the contacts of said scanning mechanism.

3. A scanning sonar display system in accordance with claim 1 in which said means connecting said stepping motor to said transducer comprises: a spool drivably connected to said stepping motor; a pulley drivably connected to said scanning mechanism; and cable means fastened to said spool and to said pulley.

4. A scanning sonar display system in accordance with claim 3 in which said means for providing fixed sector control of said scanning mechanism comprises:
a set of fixed electrical contacts;
an electrical contact mounted to the pulley of said scanning mechanism; and
electrical wires from the above said contacts connected to the said control and timing circuitry.

5. A scanning sonar display system in accordance with claim 3 in which said means for providing variable sector control comprises:
a set of movable electrical contacts;
an electrical contact mounted to the pulley of said scanning mechanism; and
electrical wires from the above said contacts to the said control and timing circuitry.

6. A scanning sonar display system in accordance with claim 1 in which said means for providing sonar data mapped from truncated cone to x-y presentation on said TV monitor comprises:
A timing ring and control including a variable one-/shot top delay and a start flip-flop which allows a variable depth oscillator to increment an eight bit counter, said eight bit counter being part of said entry memory address counter used in loading the sonar and related data into said image memory.

7. A scanning sonar display system in accordance with claim 1 in which said means for refreshing and loading of said image memory comprises;
a timing ring and control;
said refresh memory address counter;
said entry memory address counter; and
an address multiplexer and control for the multiplexer.

8. A scanning sonar display system in accordance with claim 1 in which said means for continuous adjustment of top delay, of range, of repetition rate and of sonic burst width while still maintaining maximum scan rate comprises:
a timing ring and control which is composed of a plurality of one/shot delays and oscillators;
timing components of the above said one/shot delays and oscillators having typical values ; and
an "or" circuit which allows for the maximum scanning rate.

9. A scanning sonar display system in accordance with claim 1 in which said means of presenting depth and directional data on CRT screen of said TV monitor comprises: first means providing a set of four two-digit numbers which are displayed on said TV monitor screen and give direct reading in the selected units; second means providing a plurality of dots located in four vertical lines which divide said TV monitor screen into four equal parts and are placed at a distance of one unit of the selected unit of measure apart; third means providing a set of four horizontal dashed lines which divide said TV monitor screen into four equal parts; the correspondence of data on the left hand side of said TV monitor screen with sonar return data from the left hand side of said sector scanning mechanism; the correspondence of data on the right hand side of said TV monitor screen with sonar return data from the right hand side of said sector scanning mechanism; and the correspondence of data along the vertical centerline of said TV monitor screen with sonar return data from directly to the front of said sector scanning mechanism.

10. A scanning sonar display system in accordance with claim 1 in which said means for converting slant distance to vertical distance and selecting the desired unit of measure comprises:
a potentiometer used to adjust the time for the selected said unit of measure of the unit oscillator; and
switches operable to select the desired unit of measurement by switching in capacitor means in the circuit including the potentiometer.

11. A scanning sonar display system in accordance with claim 1 in which said means for refreshing and loading of said image memory comprises: a timing ring and control to provide proper timing for the loading of the image memory, said entry memory address counter being incremented by the timing ring to provide the necessary loading address, a crystal clock used to drive the said refresh memory address counter which derives the horizontal and vertical sync pulses for said TV monitor and provides addressing for reading of the image memory for refreshing the TV monitor, and an address multiplexer operable to select either the entry memory address counter or the refresh memory address counter for addressing the image memory.

12. A scanning sonar display system in accordance with claim 11 in which said timing ring and control provides means for continuous adjustment of top delay, of range, sonar pulse rate, and sonic burst width.

13. A scanning sonar display apparatus for visually presenting objects located below the surface of a liquid comprising: a TV monitor for visually displaying images of submerged objects, a transducer means includng drive and receiving circuitry operably connected to the TV monitor to sense submerged objects and provide a signal indicative of sensed submerged objects, an image memory to store scanned data from the transducer means, a refresh memory address counter which derives timing pulses for the TV monitor and addresses the image memory so that the image can be refreshed on the TV monitor, an entry memory address counter electrically coupled to said transducer means and TV monitor for loading sonar data taken from the transducer means in the image memory, a sector scanning mechanism operable to move the transducer means to provide sonar data on said TV monitor, means including a stepping motor providing a drive system for the TV monitor and transducer means, means connecting said stepping motor to said transducer means, means for providing sector control of said scanning mechanism, means for moving the transducer means to provide sonar data mapped from a truncated cone to a x-y presentation on said TV monitor, means for refreshing and loading the image memory by use of said refresher memory address counter and said entry memory address counter, and means for presenting depth and directional data on said TV monitor.

14. The apparatus of claim 13 including: means for oscillating the sector scanning mechanism.

15. The apparatus of claim 14 wherein: the means connecting the motor to the transducer means comprises spool means drivably connected to said motor, a pulley means drivably connected to said scanning mechanism, and means operatively connecting the spool with the pulley means whereby, on operation of the motor, the scanning mechanism moves thereby moving the transducer means.

16. The apparatus of claim 13 including: means for converting a slant distance signal to vertical distance and selecting a desired unit of measurement comprising a potentiometer used for adjusting the time for the selected unit of measure and switches operable to select the desired unit of measurement by switching in capacitor means in the circuit including the potentiometer.

17. A scanning sonar display system in accordance with claim 13 wherein: said means for refreshing and loading of said image memory comprises a timing ring and control to provide proper timing for the loading of the image memory, said entry memory address counter being incremented by the timing ring to provide the necessary loading address, a crystal clock used to drive the said refresh memory address counter which derives the horizontal and vertical sync pulses for said TV monitor and provides addressing for reading of the image memory for refreshing the TV monitor, and an address multiplexer operable to select either the entry memory address counter or the refresh memory address counter for addressing the image memory.

18. A scanning sonar display system in accordance with claim 17 wherein: said timing ring and control provides means for continuous adjustment of top delay, of range, sonar pulse rate, and sonic burst width.

* * * * *